(12) United States Patent
Kinouchi et al.

(10) Patent No.: US 8,075,991 B2
(45) Date of Patent: Dec. 13, 2011

(54) STAINLESS STEEL MEMBER FOR A FUEL CELL

(75) Inventors: Kouki Kinouchi, Yokohama (JP); Wataru Kurokawa, Yokohama (JP); Shouzou Shintani, Yokohama (JP); Kinuyo Shintani, legal representative, Higashiosaka (JP); Daisuke Imoda, Yokohama (JP); Kenji Yoshihiro, Yokohama (JP); You Yamamori, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 249 days.

(21) Appl. No.: 12/376,552

(22) PCT Filed: Aug. 9, 2007

(86) PCT No.: PCT/JP2007/065922
§ 371 (c)(1),
(2), (4) Date: Feb. 5, 2009

(87) PCT Pub. No.: WO2008/020602
PCT Pub. Date: Feb. 21, 2008

(65) Prior Publication Data
US 2010/0189997 A1 Jul. 29, 2010

(30) Foreign Application Priority Data
Aug. 14, 2006 (JP) .................... 2006-220952

(51) Int. Cl.
*B32B 15/04* (2006.01)
(52) U.S. Cl. ........ 428/334; 428/472; 148/597; 148/542; 148/592; 148/605; 148/578; 148/237; 148/225; 429/53; 429/54
(58) Field of Classification Search .................. None
See application file for complete search history.

(56) References Cited

U.S. PATENT DOCUMENTS

| | | | | | |
|---|---|---|---|---|---|
| 3,584,187 | A | * | 6/1971 | Majetich et al. | 219/137 R |
| 5,009,963 | A | * | 4/1991 | Ohmi et al. | 428/472.2 |
| 5,259,935 | A | * | 11/1993 | Davidson et al. | 148/286 |
| 5,456,768 | A | * | 10/1995 | Tomari et al. | 148/280 |
| 5,656,099 | A | * | 8/1997 | Ohmi | 148/280 |
| 5,817,424 | A | * | 10/1998 | Ohmi | 428/472.1 |
| 5,906,688 | A | * | 5/1999 | Ohmi | 148/284 |
| 5,911,841 | A | * | 6/1999 | Ohmi | 148/280 |
| 6,037,061 | A | * | 3/2000 | Ohmi | 428/472.1 |
| 6,174,610 | B1 | * | 1/2001 | Ohmi | 428/469 |
| 6,379,476 | B1 | | 4/2002 | Tarutani et al. | |
| 6,612,898 | B1 | * | 9/2003 | Ohmi et al. | 148/280 |
| 2004/0188956 | A1 | * | 9/2004 | Shibata et al. | 277/647 |
| 2005/0022883 | A1 | | 2/2005 | Adams et al. | |
| 2006/0159971 | A1 | | 7/2006 | Takagi et al. | |
| 2010/0248079 | A1 | * | 9/2010 | Kinouchi et al. | 429/513 |

FOREIGN PATENT DOCUMENTS

| | | |
|---|---|---|
| JP | 07-268599 A | 10/1995 |
| JP | 2000-328200 A | 11/2000 |
| JP | 2000-345363 A | 12/2000 |
| JP | 2002-042827 A | 2/2002 |
| JP | 2003-226940 A | 8/2003 |
| JP | 2006-177492 A | 7/2006 |
| WO | 2004/019437 A1 | 3/2004 |
| WO | 2005/013393 A2 | 2/2005 |

\* cited by examiner

Primary Examiner — Jennifer McNeil
Assistant Examiner — Vera Katz
(74) Attorney, Agent, or Firm — Sughrue Mion, PLLC

(57) ABSTRACT

A stainless steel material for a fuel cell, used for a fuel cell or a cartridge for the fuel cell, having a magnetic permeability of 1.000 to 2.500, and forming a layer having a value of chromium atomic %/iron atomic % of not less than 3.0 in the most surface thereof, and/or the layer of thickness of not less than 12 nm calculated as $SiO_2$ having an oxygen atomic % of not less than 20%. Even when brought into contact with the content solution exhibiting acidity of the fuel cell, the stainless steel material reliably suppresses the elution of metal ions thereof.

2 Claims, No Drawings

STAINLESS STEEL MEMBER FOR A FUEL CELL

TECHNICAL FIELD

The present invention relates to a stainless steel material for a fuel cell, that is used for a fuel cell or for a cartridge for the fuel cell. More specifically, the invention relates to a stainless steel material which effectively suppresses the elution of metal ions thereof in an acidic content solution in the fuel cell or in the cartridge for the fuel cell.

BACKGROUND ART

It has been known that a direct methanol type fuel cell (DMFC) is suited for realizing equipment in a small size since it is capable of creating an electrochemical reaction by directly feeding methanol which is a fuel to the anode (fuel electrode) without using reformer for taking out hydrogen. Therefore, the direct methanol type fuel cell is drawing attention for use, particularly, with portable devices. Concerning such small fuel cells, use of metal materials has been proposed in an attempt to decrease the size of the cartridge and to make it possible to use under high-temperature conditions.

On the other hand, the direct methanol type fuel cell is of the nature in which methanol which is the fuel is directly fed to the anode to create the electrochemical reaction which, however, is impaired by metal ions present in the fuel methanol resulting in a decrease in the electromotive force and in a decrease in the generation capability. When treating the fuel such as methanol that is oxidized at the time of generating electricity and turns into an acidic oxide or treating the fuel cell using the fuel that tends to exhibit acidity, therefore, it is important that the metal material that comes in contact with the fuel does not elute out metal ions thereof.

To prevent elution of metal ions from the metal materials, in general, attempts have been made to treat the metal surfaces to become passive as disclosed in JP-A-2002-42827 and JP-A-2000-345363, to use an austenite type stainless steel having excellent corrosion resistance as disclosed in JP-A-2000-328200, to form a gold plating or a film of polytetrafluoromethylene, or to use titanium as a metal blank.

DISCLOSURE OF THE INVENTION

However, the above-mentioned passivation treatment of the metal surfaces or the formation of an organic film are not satisfactory for suppressing the elution of the metal materials that are used in the portions where they come in contact with the fuel such as methanol in the fuel cells. Gold plating and titanium may be satisfactory from the standpoint of suppressing the elution but are too expensive for use as general-purpose materials, and are not advantageous in economy. Therefore, it has been desired to provide a metal blank which reliably suppresses the elution of metal ions and can also be used as a general-purpose material.

Further, the nozzle of the cartridge for the fuel cell, a socket on the fuel cell side for receiving the nozzle and a valve have been made of an engineering plastics such as polyoxymethylene or the like. When it is attempted to further decrease the size of the fuel cell, however, it is desired to produce them by using metals to maintain the strength.

It is therefore an object of the present invention to provide a metal material for a fuel cell or for a cartridge for the fuel cell, which reliably suppresses the elution of metal ions even when it comes in contact with the content solution that exhibits acidity in the fuel cell.

Another object of the present invention is to provide a metal material for the fuel cell or for the cartridge for the fuel cell, which is advantageous in economy and can be used as a general-purpose material, too.

According to the present invention, there is provided a stainless steel material for a fuel cell, used for a fuel cell or a cartridge for the fuel cell, having a magnetic permeability of 1.000 to 2.500, and forming a layer having a value of chromium atomic %/iron atomic % of not less than 3.0 in the most surface thereof, and/or the larger of thickness of not less than 12 nm calculated as $SiO_2$ having an oxygen atomic % of not less than 20%.

It is desired that the stainless steel material for a fuel cell of the invention has a cationic index i of not more than 40 per 1 $cm^2$ as expressed by the following formula (1), $$i = a + 2b + 3c \qquad (1)$$

wherein a, b and c represent, respectively, a concentration (ppb) of monovalent metal ions, a concentration (ppb) of metal ions which are neither monovalent nor trivalent, and a concentration (ppb) of trivalent metal ions per 1 $cm^2$ of the stainless steel material in 25 ml of a methanol solution of when the stainless steel material is dipped in the methanol solution (containing 1% of water+4000 ppm of formic acid) and preserved therein at 60° C. for one week.

The stainless steel material of the present invention is excellent in suppressing the elution of metal ions, and can be preferably used as a material in a fuel cell or in a cartridge for fuel cell in which the content solution exhibits acidity.

Further, being formed of a metal, the material maintains strength when it is attempted to realize the fuel cell in a small size.

Further, the stainless steel material of the present invention can be used as a general-purpose material offering an advantage in economy.

The stainless steel used for a metal material of the present invention has a magnetic permeability in a range of 1.000 to 2.500, exhibiting excellent corrosion resistance by itself, and elutes out metal ions in suppressed amounts. In the present invention, the stainless steel material having the magnetic permeability in the range of 1.000 to 2.500 has a layer having a value of chromium atomic %/iron atomic % of not less than 3.0 in the most surface of the stainless steal, and/or the layer of a thickness of not less than 12 nm calculated as $SiO_2$ having an oxygen atomic % of not less than 20%. Therefore, the stainless steel exhibits further improved corrosion resistance and excellent resistance against being eluted out even when it comes in contact with the fuel which is the content solution exhibiting acidity.

The layer having an oxygen atomic % of not less than 20% stands for an oxide film. The stainless steel material of the present invention is forming the oxide film comprising chromium oxide and iron oxide in a thickness of not less than 12 nm.

By using an X-ray photoelectron spectroscopic analyzing apparatus, the oxide film of the stainless steel material of the invention is measured for the thicknesses of the layer in which chromium atomic %, iron atomic % and oxygen atomic % are not less than 20%.

The stainless steel material of the invention has a feature in its low-elution property, i.e., has a cationic index i per 1 $cm^2$ as represented by the above formula (1) of not larger than 40 and, particularly, not larger than 10.

If metal ions elute out into the fuel from the stainless steel material, hydrogen ions used for the reaction on the cathode are impaired from migrating onto the cathode. Upon measuring the amount of hydrogen ions decreased due to metal ions eluted from the stainless steel material as the cationic index expressed by the above formula (1), it is allowed to know the effect of the stainless steel material upon the generation capability of the fuel, cell.

The cationic index which is small means that the metal ions are eluted out in small amounts and little affects the generation performance of the fuel cell. According to the present invention, the stainless steel material having a cationic index smaller than a predetermined value suppresses the elution thereof to a satisfactory level and can be preferably used for the fuel cells or for the cartridge for the fuel cells.

The cationic index i per a unit area is measured by dipping the stainless steel material in 25 ml of a methanol solution (containing 1% of water+4000 ppm of formic acid) and preserving it therein at 60° C. for one week; i.e., the concentration of metal ions in the methanol solution is measured and is calculated as a value per 1 cm$^2$ of the stainless steel material. Formic acid is contained in the solution. This is because formic acid forms due to the side reaction of methanol in the fuel cell and may flow back to the portion where the stainless steel material is used. Formation of formic acid accelerates the elution of metal ions from the coil spring. In the above formula (1), monovalent metal ions a are Li$^+$, Na$^+$ and K$^+$, metal ions which are neither monovalent nor trivalent are, concretely, divalent or tetravalent metal ions b, such as Mg$^{2+}$, Ca$^{2+}$, Ti$^{2+}$, Mn$^{2+}$, Fe$^{2+}$, Co$^{2+}$, Ni$^{2+}$, Cu$^{2+}$, Zn$^{2+}$, Ge$^{4+}$, Mo$^{4+}$ and Pb$^{2+}$, and trivalent metal ions c are Al$^{3+}$, Cr$^{3+}$ and Sb$^{3+}$.

The action and effect of the present invention will become obvious from the results of Examples appearing later.

When the magnetic permeability does not lie within the range of the invention, the obtained stainless steel material exhibits a high cationic index and cannot satisfy the low-elution property (Comparative Examples 4, 5 and 6). Even when the magnetic permeability lies within the range of the invention, the cationic index becomes high and the low-elution property becomes poor if the value of chromium atomic %/iron atomic % in the most surface portion and the thickness of the layer having an oxygen atomic % of not less than 20% are not lying within the ranges of the invention (Comparative Examples 1, 2 and 3).

On the other hand, the stainless steel material of the present invention has a cationic index of not larger than 40 and excellent low-elution property (Examples 1 to 8).

In Examples appearing later, the surface state of the stainless steel material is reproduced as a plate material in which the magnetic permeability, chromium atomic %/iron atomic %, and the thickness of the layer having an oxygen atomic % of not less than 20% are within the ranges of the invention. From the results of these Examples, it is obvious that the values specified by the invention are correlated to the cationic index. It is, therefore, considered that the stainless steel materials exhibit similar cationic indexes if they have the magnetic permeability, value of chromium atomic %/iron atomic % and the thickness of the layer having oxygen atomic % of not less than 20%.

BEST MODE FOR CARRYING OUT THE INVENTION

In order to attain the above-mentioned magnetic permeability and to form the stainless steel material of the present invention in which the chromium atomic %/iron atomic % ratio is not smaller than 3.0 in the most surface thereof and/or the larger of a thickness is not less than 12 nm having the oxygen atomic % of not less than 20%, it is, first, desired to use an austenite type stainless steel having a low magnetic permeability.

Further, though the method of formation may differ to some extent depending upon the shape of the material that is to be formed, a desired shape is basically formed and, thereafter, as required, tempering is effected depending upon the degree of working followed by passivation treatment (washing with an acid).

Even when the austenite type stainless steel having a low magnetic permeability is used, a martensite state is induced depending upon the degree of forming and the magnetic permeability may increase. Upon effecting the tempering as described above, however, the residual stress can be removed, the magnetic permeability can be decreased, and an iron oxide film can be formed on the surface to improve the low-elution property of the stainless steel material.

The passivation is conducted by washing away iron that is not forming an oxide film, and forming a chromium oxide film making it possible to further improve the low-elution property of the stainless steel material. Upon combining the passivation treatment with the tempering, the cationic index can be further decreased.

The tempering employed, as required, for forming the stainless steel material of the present invention works to remove residual stress in the stainless steel material after the forming and to accomplish stability. In particular, the tempering in a salt bath that will be described later works to decrease martensite induced by the forming, and to decrease the magnetic permeability while forming an iron oxide film imparting low-elution property to the stainless steel material itself.

As the tempering that exhibits the above action and effect, there can be exemplified a tempering in a salt bath when the stainless steel material is, for example, a coil spring. The coil spring is subjected to a severe forming such as stretching working/coiling working. The salt bath, however, has a large heat capacity, and is capable of effecting the heat treatment within a relatively short period of time and, therefore, of effectively achieving the above action and effect.

In the salt bath tempering, though not limited thereto only, there can be used a nitrate, a nitrite or the like as a salt bath agent. The coil spring is treated by being dipped in the salt bath heated in a range of 270 to 420° C. and heated for 10 to 30 minutes.

A stainless steel material that needs to be formed to a low degree may be tempered in an electric furnace. In the tempering in the electric furnace, the temperature is desirably in a range of 270 to 420° C., and the treating time is desirably in a range of 10 to 30 minutes.

When the tempering is to be effected in the electric furnace, too, the cationic index can be decreased to a value of smaller than 10 by the passivation.

The tempering is followed by washing with water. In the tempering in the salt bath, in particular, the rock salt adhered to the stainless steel material must be removed. Water used here may be well water.

After having been tempered, the stainless steel material of the present invention is subjected to the passivation (washing with acid) in order to wash away iron that is not forming an oxide film, to form a chromium oxide film, to improve low-elution property of the stainless steel material and to further decrease the cationic index.

The passivation can be conducted by a known method. The amount of removing iron which is not forming an oxide film and the amount of forming a chromium oxide film vary depending upon the kind of the organic acid solution that is used, concentration and temperature thereof and the treating time, and cannot be exclusively specified. When the nitric acid of a concentration of 30% by weight is used, however, the treatment is desirably conducted at 30 to 50° C. for 5 to 30 minutes.

After the passivation treatment, the stainless steel material is washed with water to remove acid adhered thereto. Here, as will be described later, a final step is effected for washing with pure water. The water for removing the acid may be well water.

After the passivation treatment, the stainless steel material in the washing step is washed by the application of ultrasonic vibration in a state of being dipped in pure water without containing metal ions. Upon being washed with ultrasonic waves, impurities adhered to the stainless steel material are removed and purified. Thus, the stainless steel material is produced for use in the fuel cell or for use in the cartridge for the fuel cell.

As the stainless steel material for the fuel cell or for the cartridge for the fuel cell, there can be exemplified various materials used for the fuel cells or for the cartridge for fuel cells so far as they have the above-mentioned features. Though not limited thereto only, there can be preferably exemplified a coil spring used for a valve of the cartridge for the fuel cell, a nozzle of the cartridge for the fuel cell, and a socket and a valve of a fuel tank of the fuel cell.

EXAMPLES

Measuring Methods

[Magnetic Permeability]

Measured by using a permeameter (μmeter). When the thickness for measurement was not enough, the samples were overlapped one upon another to obtain a thickness which could be measured maintaining stability

[Chromium Atomic %/Iron Atomic % Ratio, and Thickness of the Layer Having an Oxygen Atomic % of not Less than 20%]

The chromium atomic %/iron atomic % ratio, and the thickness of the layer having an oxygen atomic % of not less than 20%, were measured by using an X-ray photoelectron spectroscopic analyzer (XPS). Measurement was taken from a region of a diameter of 10 μm to 100 μm and, usually, from a diameter of 100 μm when there was no particular limitation in the shape. Chromium, iron, nickel, carbon and oxygen were measured in the most surface portion of the metal material, and a ratio Cr/Fe of chromium atomic %/iron atomic % was found. Here, in case carbon exceeded 10 atomic % due to surface contamination, the surface was cleaned by sputtering with argon until carbon became not larger than 10 atomic %, and this moment was regarded to be the most surface portion to find the ratio Cr/Fe. After the most surface portion was measured, the surface of the metal material was sputtered with argon at a rate of 2 to 10 nm/min calculated as $SiO_2$ for 30 seconds to measure chromium, iron, nickel, carbon and oxygen. Upon repeating the above operation, the sputtered thickness calculated as $SiO_2$ could be found until the oxygen atomic % became just not larger than 20%. This thickness was defined to be the thickness of the layer having an oxygen atomic % of not less than 20%.

The XPS measurement was taken by using Quantum 2000 manufactured by PHI Co. using an Al monochrometer as a source of X-ray and by using MultiPak which is a software for data analysis.

[Cationic Index]

A stainless steel plate (surface area of 4.00 cm$^2$) was dipped in 25 ml of a methanol solution (containing 1% of water+4000 ppm of formic acid) and preserved therein at 60° C. for one week. The metal ion concentration in the methanol solution was measured by using the ICP-MS, and the cationic index was measured by using the above formula (1).

Example 1

A stainless steel plate produced by rolling an austenite type stainless steel having a magnetic permeability of 1.000 was so cut as to possess a surface area of 4.00 cm$^2$, and was tempered being dipped in a salt bath of a nitrate and a nitrite maintained at a temperature of 350° C. for 20 minutes. After washed with water, the stainless steel plate was dipped in pure water and was washed by the application with ultrasonic vibration.

Example 2

A stainless steel plate was produced in the same manner as in Example 1 with the exception of being passivation-treated after the tempering by using nitric acid (concentration of 30% by weight) at 40° C. for 10 minutes.

Example 3

A stainless steel plate produced by repetitively rolling an austenite type stainless steel having a magnetic permeability of 1.000 until the magnetic permeability exceeded 1.150 was so cut as to possess a surface area of 4.00 cm$^2$, and was tempered in an electric furnace heated at 270° C. for 30 minutes. After washed with water, the stainless steel plate was dipped in pure water and was washed by the application with ultrasonic vibration.

Example 4

A stainless steel plate was produced in the same manner as in Example 3 with the exception of being passivation-treated after the tempering by using nitric acid (concentration of 30% by weight) at 40° C. for 10 minutes.

Example 5

A stainless steel plate was produced in the same manner as in Example 3 with the exception of conducting the tempering at 350° C.

Example 6

A stainless steel plate produced by repetitively rolling an austenite type stainless steel having a magnetic permeability of 1.000 until the magnetic permeability became 1.930 was so cut as to possess a surface area of 4.00 cm$^2$, and was passivation-treated by using nitric acid (concentration of 30% by weight) at 40° C. for 10 minutes. After washed with water, the stainless steel plate was dipped in pure water and was washed by the application with ultrasonic vibration.

Example 7

A stainless steel plate was produced in the same manner as in Example 6 with the exception of repeating the rolling until the magnetic permeability became 2.480.

Comparative Example 1

A stainless steel plate produced by rolling an austenite type stainless steel having a magnetic permeability of 1.000 was so cut as to possess a surface area of 4.00 cm$^2$. After washed with water, the stainless steel plate was dipped in pure water and was washed by the application with ultrasonic vibration.

Comparative Example 2

An austenite type stainless steel having a magnetic permeability of 1.000 was repetitively rolled until the magnetic permeability thereof became 1.360, was so cut as to possess a surface area of 4.00 cm$^2$, and was passivation-treated by using nitric acid (concentration of 30% by weight) at 25° C. for 30 minutes. After washed with water, the stainless steel plate was dipped in pure water and was washed by the application with ultrasonic vibration.

Comparative Example 3

An austenite type stainless steel having a magnetic permeability of 1.000 was repetitively rolled until the magnetic permeability thereof became 1.154, was so cut as to possess a surface area of 4.00 cm$^2$, and was tempered in an electric furnace heated at 270° C. for 10 minutes. After washed with water, the stainless steel plate was dipped in pure water and was washed by the application with ultrasonic vibration.

Comparative Example 4

An austenite type stainless steel having a magnetic permeability of 1.000 was repetitively rolled until the magnetic permeability thereof became 2.731, was so cut as to possess a surface area of 4.00 cm$^2$, and was passivation-treated by using nitric acid (concentration of 30% by weight) at 40° C. for 10 minutes. After washed with water, the stainless steel plate was dipped in pure water and was washed by the application with ultrasonic vibration.

Comparative Example 5

A stainless steel plate was produced in the same manner as in Comparative Example 1 with the exception of using a highly magnetic martensite type stainless steel plate.

Comparative Example 6

A stainless steel plate was produced in the same manner as in Comparative Example 1 with the exception of using a highly magnetic ferrite type stainless steel plate.

TABLE 1

| | | | Surface state | | |
| --- | --- | --- | --- | --- | --- |
| | Kind | Mag. permeability | Most surface portion Cr atomic %/ Fe atomic % | Thickness of layer as $SiO_2$ having $O_2$ atomic % of not less than 20% | Cationic index (i) |
| Comp. Ex. 1 | austenite type | 1.020 | 0.90 | 6.4 nm | 45 |
| Comp. Ex. 2 | austenite type | 1.360 | 1.60 | 5.5 nm | 55 |
| Comp. Ex. 3 | austenite type | 1.154 | 0.10 | 11.5 nm | 45 |
| Comp. Ex. 4 | austenite type | 2.731 | 5.17 | 13.3 nm | 48 |
| Comp. Ex. 5 | martensite type | highly magnetic | 0.15 | 10.0 nm | 57 |
| Comp. Ex. 6 | ferrite type | highly magnetic | 0.16 | 10.5 nm | 53 |
| Ex. 1 | austenite type | 1.011 | 0.17 | 29.5 nm | 6 |
| Ex. 2 | austenite type | 1.010 | 14.43 | 12.2 nm | 3 |
| Ex. 3 | austenite type | 1.152 | 0.14 | 13.5 nm | 31 |
| Ex. 4 | austenite type | 1.160 | 5.19 | 13.3 nm | 8 |
| Ex. 5 | austenite type | 1.150 | 0.14 | 15.8 nm | 19 |
| Ex. 6 | austenite type | 1.930 | 3.25 | 9.4 nm | 33 |
| Ex. 7 | austenite type | 2.480 | 5.17 | 13.4 nm | 40 |

The invention claimed is:

1. A stainless steel coil spring for a fuel cell or for a fuel cell cartridge, being made from an austenite type stainless steel, having a magnetic permeability that is decreased to 1.000 to 2.500 through stretching/coiling working, followed by tempering and forming a layer having a value of chromium atomic %/iron atomic % of not less than 3.0 in the most surface thereof, and/or a layer of a thickness of not less than 12 nm calculated as $SiO_2$ having an oxygen atomic % of not less than 20%.

2. The stainless steel coil spring for a fuel cell according to claim 1, wherein a cationic index i is not more than 40 per 1 $cm^2$ as expressed by the following formula (1), $$i = a + 2b + 3c \quad (1)$$

wherein a, b and c represent, respectively, a concentration, ppb, of monovalent metal ions, a concentration, ppb, of metal ions which are neither monovalent nor trivalent, and a concentration, ppb, of trivalent metal ions per 1 $cm^2$ to the stainless steel material in a methanol solution when the stainless steel coil spring is dipped in a methanol solution containing 1% of water+4000 ppm of formic acid and preserved therein at 60° C. for one week.

* * * * *